(12) United States Patent
Imai et al.

(10) Patent No.: US 9,218,834 B2
(45) Date of Patent: Dec. 22, 2015

(54) DUAL STAGE MICROACTUATOR FLEXURE FEATURE FOR MINIMIZING ELECTRICAL SHORTS

(71) Applicant: HGST Netherlands B.V., Amsterdam (NL)

(72) Inventors: Hideto Imai, Yokohama (JP); Yoshio Uematsu, Fujisawa (JP)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 14/163,845

(22) Filed: Jan. 24, 2014

(65) Prior Publication Data

US 2015/0213818 A1 Jul. 30, 2015

(51) Int. Cl.
*G11B 5/596* (2006.01)
*G11B 5/48* (2006.01)

(52) U.S. Cl.
CPC ............ *G11B 5/4833* (2013.01); *G11B 5/4873* (2013.01)

(58) Field of Classification Search
CPC .. G11B 5/5552; G11B 5/4873; G11B 5/4853; G11B 5/482; G11B 5/4833; G11B 5/486; G11B 5/60
USPC ....................................................... 360/294.4
See application file for complete search history.

(56) References Cited

U.S. PATENT DOCUMENTS

| | | | |
|---|---|---|---|
| 6,856,075 B1 * | 2/2005 | Houk et al. ................. 310/348 |
| 7,051,424 B2 * | 5/2006 | Yao et al. ................. 29/603.06 |
| 7,280,319 B1 | 10/2007 | McNab | |
| 7,312,956 B2 | 12/2007 | Yao et al. | |
| 7,379,274 B2 | 5/2008 | Yao et al. | |
| 7,408,745 B2 | 8/2008 | Yao et al. | |
| 7,554,772 B2 * | 6/2009 | Yao et al. ................... 360/294.3 |
| 7,995,310 B1 * | 8/2011 | Pan ............................ 360/234.6 |
| 8,085,508 B2 * | 12/2011 | Hatch ........................ 360/294.4 |
| 8,130,469 B2 | 3/2012 | Yao | |
| 8,149,545 B1 * | 4/2012 | Chai et al. ................... 360/294.3 |
| 8,248,734 B2 | 8/2012 | Fuchino | |
| 8,248,735 B2 | 8/2012 | Fujimoto et al. | |
| 8,593,765 B2 * | 11/2013 | Uematsu et al. ........... 360/294.4 |
| 8,792,214 B1 * | 7/2014 | Bjorstrom et al. ......... 360/245.8 |
| 8,885,297 B1 * | 11/2014 | Bjorstrom et al. ......... 360/245.8 |

(Continued)

FOREIGN PATENT DOCUMENTS

| | | |
|---|---|---|
| JP | 2001-307442 | 11/2001 |
| JP | 2001-307443 | 11/2001 |
| JP | 2001-307444 | 11/2001 |

OTHER PUBLICATIONS

Zheng et al., "Design and Control of a Rotary Dual-Stage Actuator Positioning System", The University of Newcastle, Australia, Mar. 28, 2011, pp. 1-32, URL: http://www.eng.newcastle.edu.au/~mf140/home/Papers/rotarydsa-r4.pdf.

*Primary Examiner* — Will J Klimowicz
(74) *Attorney, Agent, or Firm* — John D. Henkhaus

(57) ABSTRACT

Approaches to a flexure gimbal assembly for a hard-disk drive (HDD), having a feature for reducing the risk of electrical shorts, include a flexure having an electrically conductive layer and an insulating layer having a flexure tongue with which one or more microactuator piezo actuating device is coupled, where the flexure tongue comprises a gap positioned to inhibit contact between the conductive adhesive and the conductive layer of the flexure which may otherwise cause an electrical short.

9 Claims, 6 Drawing Sheets

(56) References Cited

U.S. PATENT DOCUMENTS

| | | | |
|---|---|---|---|
| 2003/0202292 A1* | 10/2003 | Arya et al. | 360/294.4 |
| 2006/0038304 A1* | 2/2006 | Osako et al. | 257/789 |
| 2006/0072247 A1* | 4/2006 | Yao et al. | 360/294.4 |
| 2006/0098347 A1 | 5/2006 | Yao et al. | |
| 2009/0244786 A1* | 10/2009 | Hatch | 360/294.4 |
| 2011/0085269 A1* | 4/2011 | Hanya et al. | 360/244.2 |
| 2011/0149440 A1* | 6/2011 | Uematsu et al. | 360/245.3 |

* cited by examiner

ATTACH, USING AN ELECTRICALLY CONDUCTIVE ADHESIVE, ONE OR MORE PIEZO ACTUATING DEVICE TO A FLEXURE TONGUE OF A FLEXURE COMPRISING AN ELECTRICALLY CONDUCTIVE LAYER AND AN INSULATING LAYER COMPRISING THE FLEXURE TONGUE, WHERE THE FLEXURE TONGUE COMPRISES A GAP POSITIONED TO INHIBIT CONTACT BETWEEN THE CONDUCTIVE ADHESIVE AND THE CONDUCTIVE LAYER OF THE FLEXURE
402

FIG. 4

DUAL STAGE MICROACTUATOR FLEXURE FEATURE FOR MINIMIZING ELECTRICAL SHORTS

FIELD OF THE INVENTION

Embodiments of the invention relate generally to hard disk drives and more particularly to minimizing electrical shorts associated with a dual stage microactuator flexure assembly.

BACKGROUND

A hard disk drive (HDD) is a non-volatile storage device that is housed in a protective enclosure and stores digitally encoded data on one or more circular disks having magnetic surfaces. When an HDD is in operation, each magnetic-recording disk is rapidly rotated by a spindle system. Data is read from and written to a magnetic-recording disk using a read/write head that is positioned over a specific location of a disk by an actuator.

A read/write head uses a magnetic field to read data from and write data to the surface of a magnetic-recording disk. Write heads make use of the electricity flowing through a coil, which produces a magnetic field. Electrical pulses are sent to the write head, with different patterns of positive and negative currents. The current in the coil of the write head induces a magnetic field across the gap between the head and the magnetic disk, which in turn magnetizes a small area on the recording medium.

An HDD includes at least one head gimbal assembly (HGA) that generally includes a slider that houses the head, and a suspension. Each slider is attached to the free end of a suspension that in turn is cantilevered from the rigid arm of an actuator. Several semi-rigid arms may be combined to form a single movable unit, a head stack assembly (HSA), having either a linear bearing or a rotary pivotal bearing system. The suspension of a conventional disk drive typically includes a relatively stiff load beam with a mount plate at the base end, which subsequently attaches to the actuator arm, and whose free end mounts a flexure that carries the slider and its head. It is the job of the flexure to provide gimbaled support for the slider so that the read/write head can pitch and roll in order to adjust its orientation.

The flexure in an integrated lead suspension is generally made out of a laminated multilayer material. Typically, it consists of a support layer (e.g., steel), a dielectric insulating layer (e.g., polyimide), a conductor layer (e.g., copper), and a cover layer (e.g., polyimide) that insulates the conductor layer. The electrical lead lines are etched into the conductor layer, while the polyimide layer serves as the insulator from the underlying steel support layer. The steel support layer is also patterned to provide strength and gimbaling characteristics to the flexure. The conducting leads, called traces, which electrically connect the head transducer to the read/write electronics, are often routed on both sides of the suspension, especially in the gimbal region. Normally the traces consist of copper conductor with polyimide dielectric insulating and cover layers but no support stainless steel layer and only provide the electrical function. The primary mechanical support function is provided by the flexure legs (e.g., steel) which normally run adjacent to the traces.

Increasing areal density (a measure of the quantity of information bits that can be stored on a given area of disk surface) is one of the ever-present holy grails of hard disk drive design evolution, and has led to the necessary development and implementation of secondary and even tertiary actuators for improved head positioning through relatively fine positioning, in addition to a primary voice coil motor (VCM) actuator which provides relatively coarse positioning. Some hard disk drives employ micro- or milli-actuator designs to provide second stage actuation of the recording head to enable more accurate positioning of the head relative to the recording track. Milli-actuators are broadly classified as actuators that move the entire front end of the suspension: spring, load beam, flexure and slider. Micro-actuators are broadly classified as actuators that move only the slider, moving it relative to the load beam, or moving the read-write element only, moving it relative to the slider body.

Piezoelectric (PZT) based and capacitive micro-machined transducers are two types of microactuators that have been proposed for use with HDD sliders. The microactuators need to be mechanically and electrically coupled to flexure support structure, with very limited mechanical tolerances, such as by using an electrically conductive adhesive. Thus, undesirable electrical shorts may occur which are associated with this microactuator assembly process. Further, because manufacturing yield is typically a fundamental design and manufacturing goal, eliminating or minimizing electrical shorts is desirable.

SUMMARY OF EMBODIMENTS

Embodiments of the invention are directed to a flexure gimbal assembly for a hard-disk drive (HDD), having a feature for reducing the risk of electrical shorts. The electrical short of concern is that which may be caused in the process of attaching a piezo actuation device of a secondary actuation system to a supporting flexure portion of a head slider suspension.

In embodiments, a flexure gimbal assembly comprises a flexure having an electrically conductive layer and an insulating layer having a flexure tongue with which one or more microactuator piezo actuating device is coupled, for example, with an electrically conductive adhesive. The flexure tongue comprises a gap, slit, hole, void, and the like, positioned to inhibit contact between the conductive adhesive and the conductive layer of the flexure which would cause an electrical short. Furthermore, and according to embodiments, the electrically conductive adhesive used has a viscosity in the range of 10 Pa-s to 60 Pa-s, such that a tight non-floating bond is achieved without allowing the adhesive to overflow to underneath the flexure tongue.

Embodiments discussed in the Summary of Embodiments section are not meant to suggest, describe, or teach all the embodiments discussed herein. Thus, embodiments of the invention may contain additional or different features than those discussed in this section.

BRIEF DESCRIPTION OF THE DRAWINGS

Embodiments of the invention are illustrated by way of example, and not by way of limitation, in the figures of the accompanying drawings and in which like reference numerals refer to similar elements and in which:

FIG. 4 is a flowchart illustrating a process for manufacturing a flexure gimbal assembly for a hard disk drive, according to an embodiment of the invention.

DETAILED DESCRIPTION

Approaches to a flexure gimbal assembly for a hard-disk drive (HDD), having a feature for reducing the risk of electrical shorts, are described. In the following description, for the purposes of explanation, numerous specific details are set forth in order to provide a thorough understanding of the embodiments of the invention described herein. It will be apparent, however, that the embodiments of the invention described herein may be practiced without these specific details. In other instances, well-known structures and devices are shown in block diagram form in order to avoid unnecessarily obscuring the embodiments of the invention described herein.

Physical Description of Illustrative Embodiments of the Invention

Figure 1:
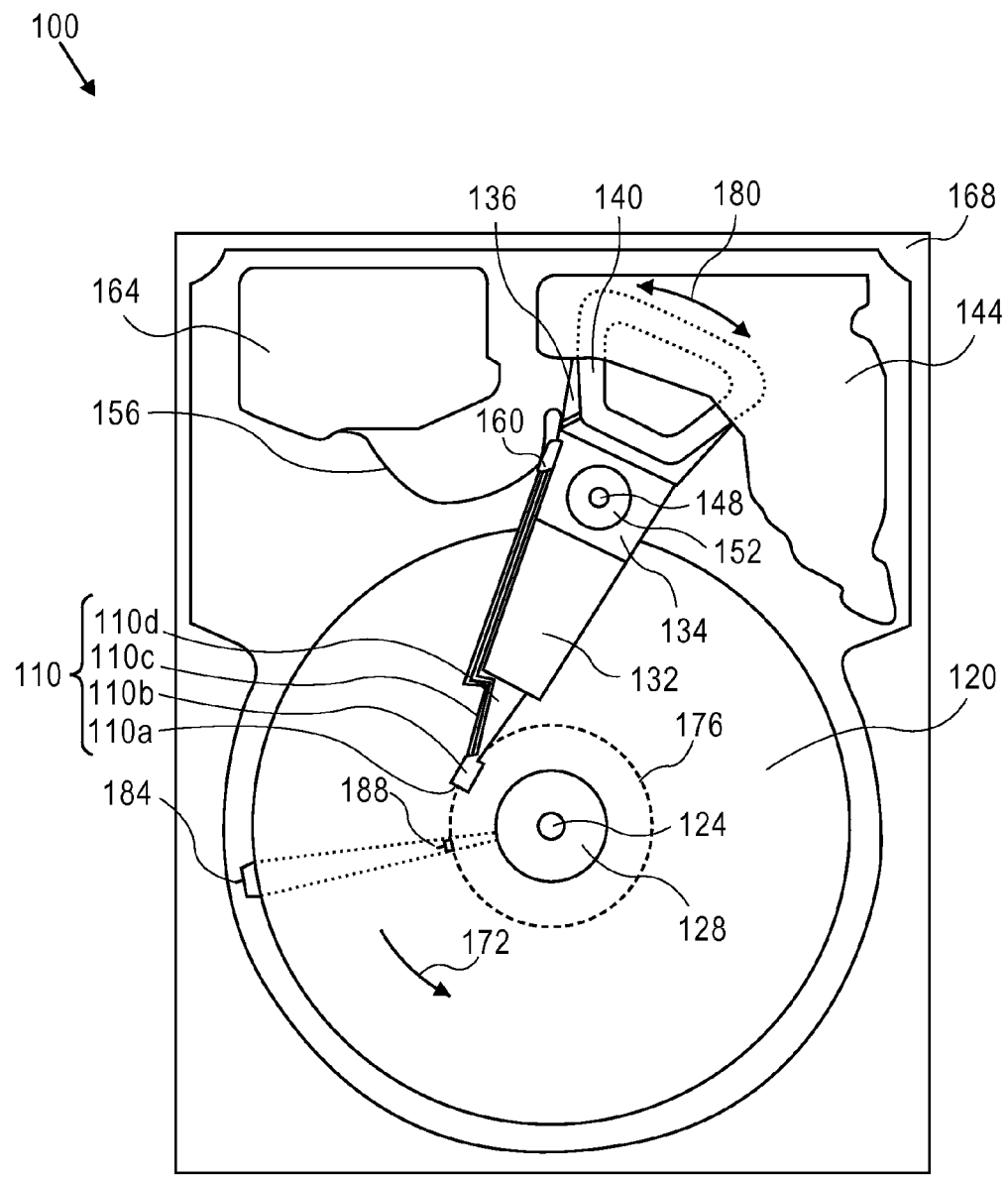
FIG. 1 is a plan view illustrating a hard disk drive, according to an embodiment of the invention.

Embodiments of the invention may be used in the context of reducing the risk of electrical shorts in a microactuator flexure gimbal assembly for a hard-disk drive (HDD) storage device. Thus, a plan view illustrating an HDD 100 is shown in FIG. 1. FIG. 1 illustrates an example of the functional arrangement of components of the HDD including a slider 110b that includes a magnetic-reading/recording head 110a. Collectively, slider 110b and head 110a may be referred to as a head slider. The HDD 100 includes at least one head gimbal assembly (HGA) 110 including the head slider, a lead suspension 110c attached to the head slider, and a load beam 110d attached to the lead suspension 110c. The HDD 100 also includes at least one magnetic-recording media 120 rotatably mounted on a spindle 124 and a drive motor attached to the spindle 124 for rotating the media 120. The head 110a includes a write element and a read element for respectively writing and reading information stored on the media 120 of the HDD 100. The media 120 or a plurality of disks may be affixed to the spindle 124 with a disk clamp 128.

The HDD 100 further includes an arm 132 attached to the HGA 110, a carriage 134, a voice-coil motor (VCM) that includes an armature 136 including a voice coil 140 attached to the carriage 134; and a stator 144 including a voice-coil magnet. The armature 136 of the VCM is attached to the carriage 134 and is configured to move the arm 132 and the HGA 110 to access portions of the media 120 being mounted on a pivot-shaft 148 with an interposed pivot-bearing assembly 152. In the case of an HDD having multiple disks, or platters as disks are sometimes referred to in the art, the carriage 134 is called an "E-block," or comb, because the carriage is arranged to carry a ganged array of arms that gives it the appearance of a comb.

An assembly comprising a head gimbal assembly (e.g., HGA 110) including a suspension flexure to which the head slider is coupled, an actuator arm (e.g., arm 132) to which the suspension is coupled, and an actuator (e.g., the VCM) to which the actuator arm is coupled, may be collectively referred to as a head stack assembly (HSA). An HSA may, however, include more or fewer components than those described. For example, an HSA may refer to an assembly that further includes electrical interconnection components, such as a suspension tail. Generally, an HSA is the assembly configured to move the head slider to access portions of the media 120 (e.g., magnetic-recording disks) for read and write operations.

With further reference to FIG. 1, in accordance with an embodiment of the present invention, electrical signals, for example, current to the voice coil 140 of the VCM, write signal to and read signal from the head 110a, are provided by a flexible interconnect cable 156 ("flex cable"). Interconnection between the flex cable 156 and the head 110a may be provided by an arm-electronics (AE) module 160, which may have an on-board pre-amplifier for the read signal, as well as other read-channel and write-channel electronic components. The AE 160 may be attached to the carriage 134 as shown. The flex cable 156 is coupled to an electrical-connector block 164, which provides electrical communication through electrical feedthroughs provided by an HDD housing 168. The HDD housing 168, also referred to as a casting, depending upon whether the HDD housing is cast, in conjunction with an HDD cover provides a sealed, protective enclosure for the information storage components of the HDD 100.

With further reference to FIG. 1, in accordance with an embodiment of the present invention, other electronic components, including a disk controller and servo electronics including a digital-signal processor (DSP), provide electrical signals to the drive motor, the voice coil 140 of the VCM and the head 110a of the HGA 110. The electrical signal provided to the drive motor enables the drive motor to spin providing a torque to the spindle 124 which is in turn transmitted to the media 120 that is affixed to the spindle 124 by the disk clamp 128; as a result, the media 120 spins in a direction 172. The spinning media 120 creates a cushion of air that acts as an air-bearing on which the air-bearing surface (ABS) of the slider 110b rides so that the slider 110b flies above the surface of the media 120 without making contact with a thin magnetic-recording medium in which information is recorded.

The electrical signal provided to the voice coil 140 of the VCM enables the head 110a of the HGA 110 to access a track 176 on which information is recorded. Thus, the armature 136 of the VCM swings through an arc 180 which enables the HGA 110 attached to the armature 136 by the arm 132 to access various tracks on the media 120. Information is stored on the media 120 in a plurality of stacked tracks arranged in sectors on the media 120, for example, sector 184. Correspondingly, each track is composed of a plurality of sectored track portions, for example, sectored track portion 188. Each sectored track portion 188 is composed of recorded data and a header containing a servo-burst-signal pattern, for example, an ABCD-servo-burst-signal pattern, information that identifies the track 176, and error correction code information. In accessing the track 176, the read element of the head 110a of the HGA 110 reads the servo-burst-signal pattern which provides a position-error-signal (PES) to the servo electronics, which controls the electrical signal provided to the voice coil 140 of the VCM, enabling the head 110a to follow the track 176. Upon finding the track 176 and identifying a particular sectored track portion 188, the head 110a either reads data from the track 176 or writes data to the track 176 depending on instructions received by the disk controller from an external agent, for example, a microprocessor of a computer system.

Introduction

Embodiments of the invention are relevant to HGA microactuator designs. For example, embodiments may be particularly applicable to, but are not limited to, a flexure-integrated microactuator system such as the one described in U.S. Pat. No. 8,085,508 ("the '508 patent), the subject matter of which is incorporated by reference for all purposes as if fully set forth herein. The microactuator system described in the referenced '508 patent comprises two piezoelectric (PZT) motors placed within the flexure gimbal and located just proximal to the slider when viewed from the point of origin of the primary VCM actuator. As mentioned, the microactuators need to be mechanically and electrically coupled to flexure support structure, all of which are relatively small and thin parts, with a high degree of positional accuracy. Thus, undesirable electrical shorts may occur which are associated with this microactuator assembly process. Further, because manufacturing yield is typically a fundamental design and manufacturing goal, especially in the context of hard disk drives, eliminating or minimizing electrical shorts is desirable.

Flexure Gimbal Assembly

Figure 2:
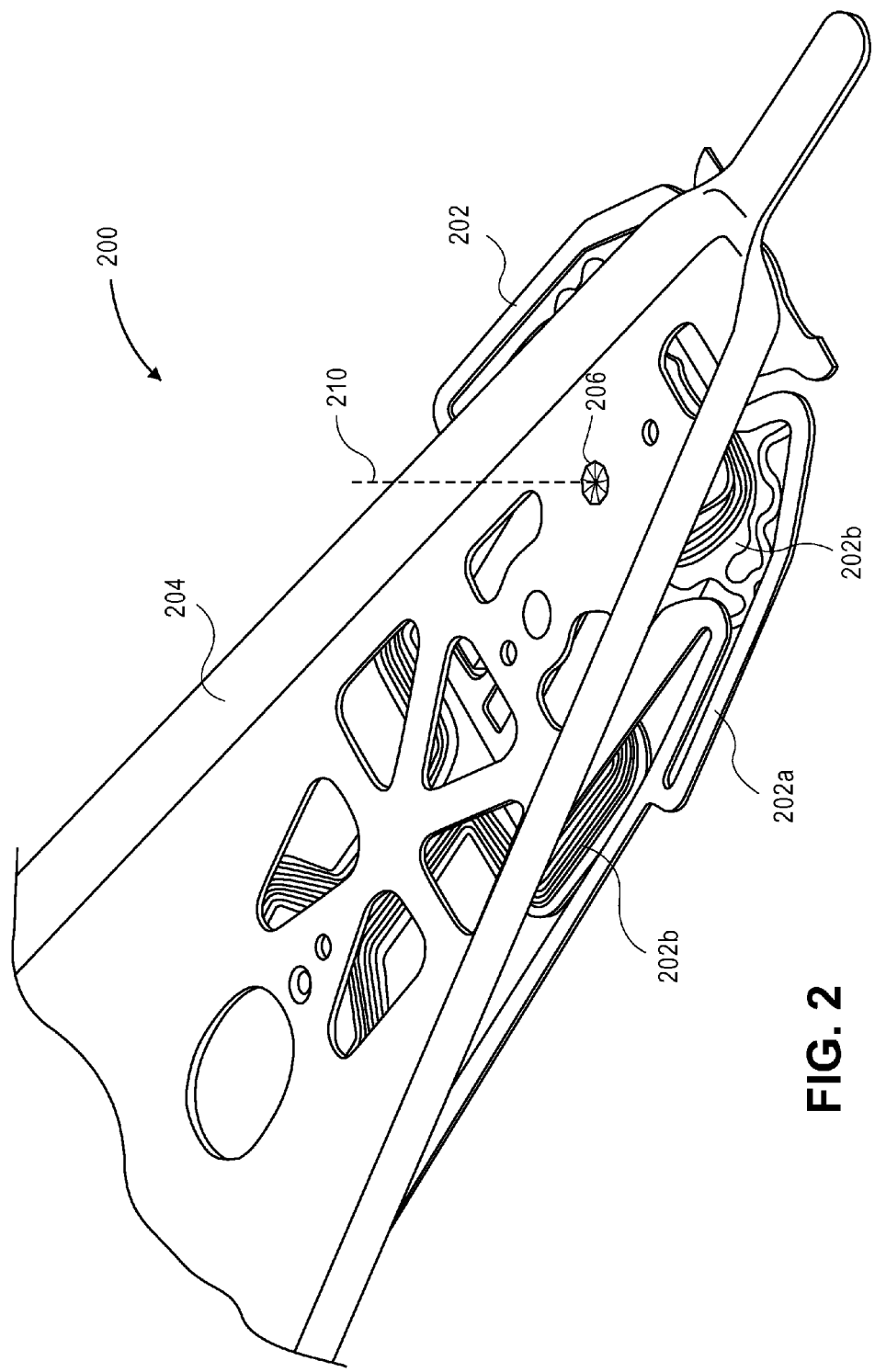
FIG. 2 is a perspective view illustrating a head gimbal assembly (HGA), according to an embodiment of the invention.

FIG. 2 is a perspective view illustrating a head gimbal assembly (HGA), according to an embodiment of the invention. HGA 200 comprises a flexure 202 and a load beam 204 having a dimple 206. According to an embodiment, flexure 202 comprises multiple assembled layers such as a stainless steel layer 202a (also referred to herein as a "spring layer" due to one of its functional characteristics) coupled with an insulator (or "insulating") layer 202b. Flexure 202 may also, but need not, comprise a separate conductor layer, as described in the '508 patent. Flexure 202 is movably coupled to the load beam 204 via the dimple 206 and has freedom of rotation about the dimple axis 210. Because a slider is coupled to a slider attachment platform 302 (FIG. 3A) of flexure 202, the slider likewise has freedom of rotation about dimple axis 210.

Figure 3A:
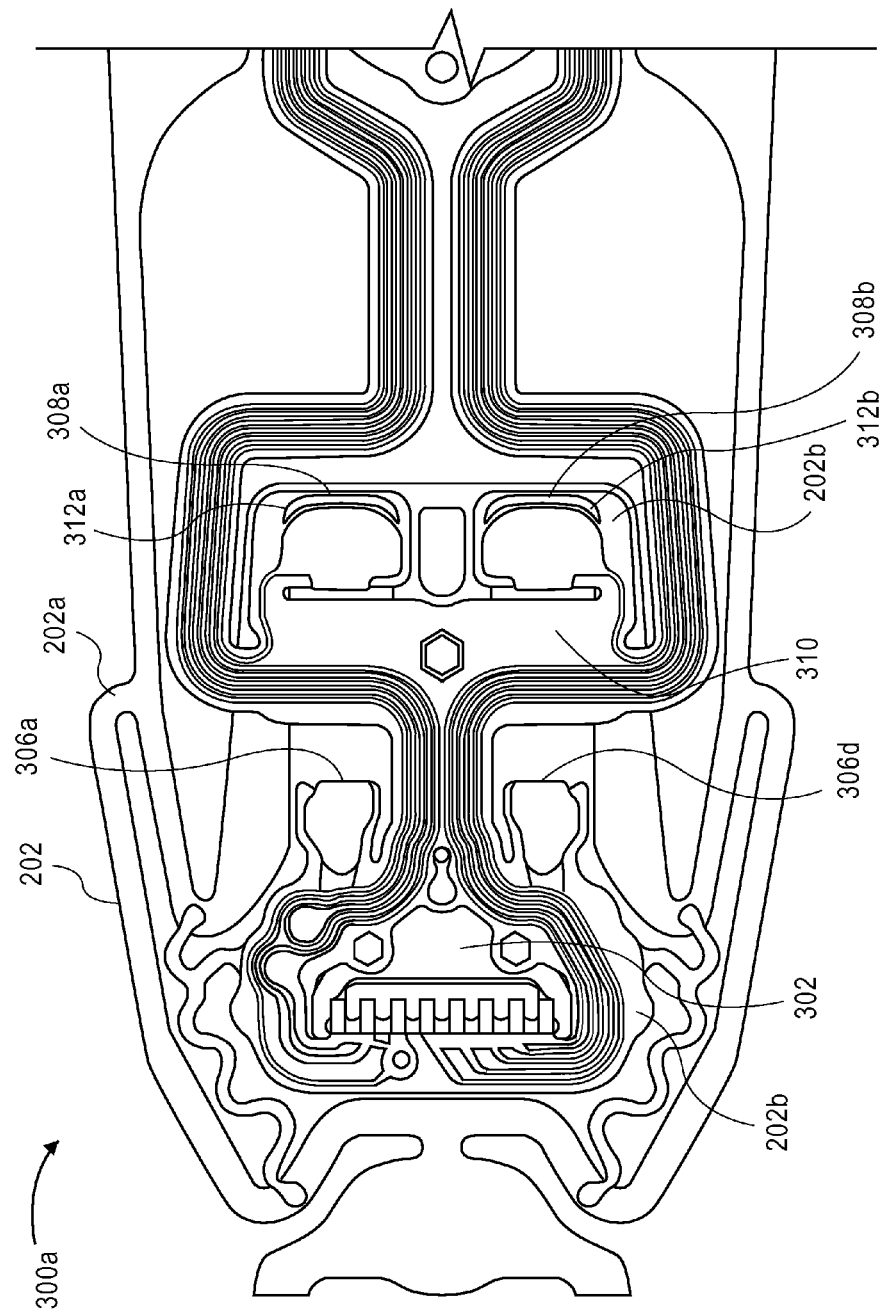
FIG. 3A is a bottom plan view illustrating a flexure gimbal assembly, according to an embodiment of the invention, illustrated with the slider and the piezo actuating devices omitted.

FIG. 3A is a bottom plan view illustrating a flexure gimbal assembly, according to an embodiment of the invention, illustrated with the slider and the piezo actuating devices omitted. Flexure gimbal assembly 300a comprises the flexure 202, which comprises the stainless steel layer 202a and the insulator layer 202b. Flexure gimbal assembly 300a further comprises a slider attachment platform 302, and a flexure tongue 310.

Figure 3B:
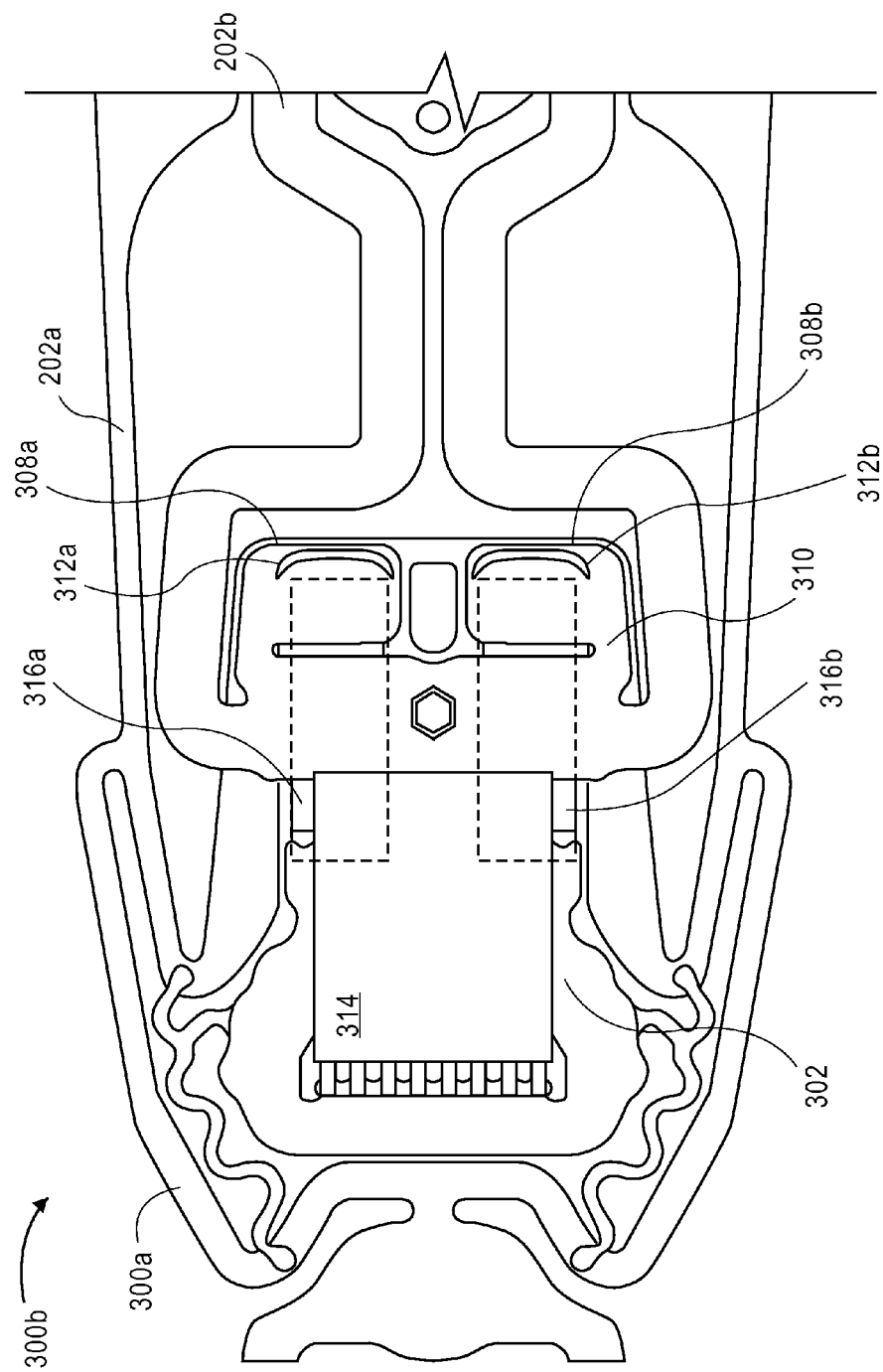
FIG. 3B is a bottom plan view illustrating the flexure gimbal assembly of FIG. 3A, illustrated with slider and piezo actuating devices in place, according to an embodiment of the invention.

FIG. 3B is a bottom plan view of the flexure gimbal assembly of FIG. 3A, illustrated with slider and piezo actuating devices in place, according to an embodiment of the invention. Flexure assembly 300b comprises the components of flexure assembly 300a of FIG. 3A, with the slider 314 (such as slider 110b of FIG. 1) and a piezo actuating device 316a, and a piezo actuating device 316b attached. Slider 314 and piezo actuating devices 316a, 316b, are located on opposing sides of flexure assembly 300b, where the slider side is arbitrarily referred to as the bottom side and the piezo side is arbitrarily referred to as the top side.

Figure 3C:
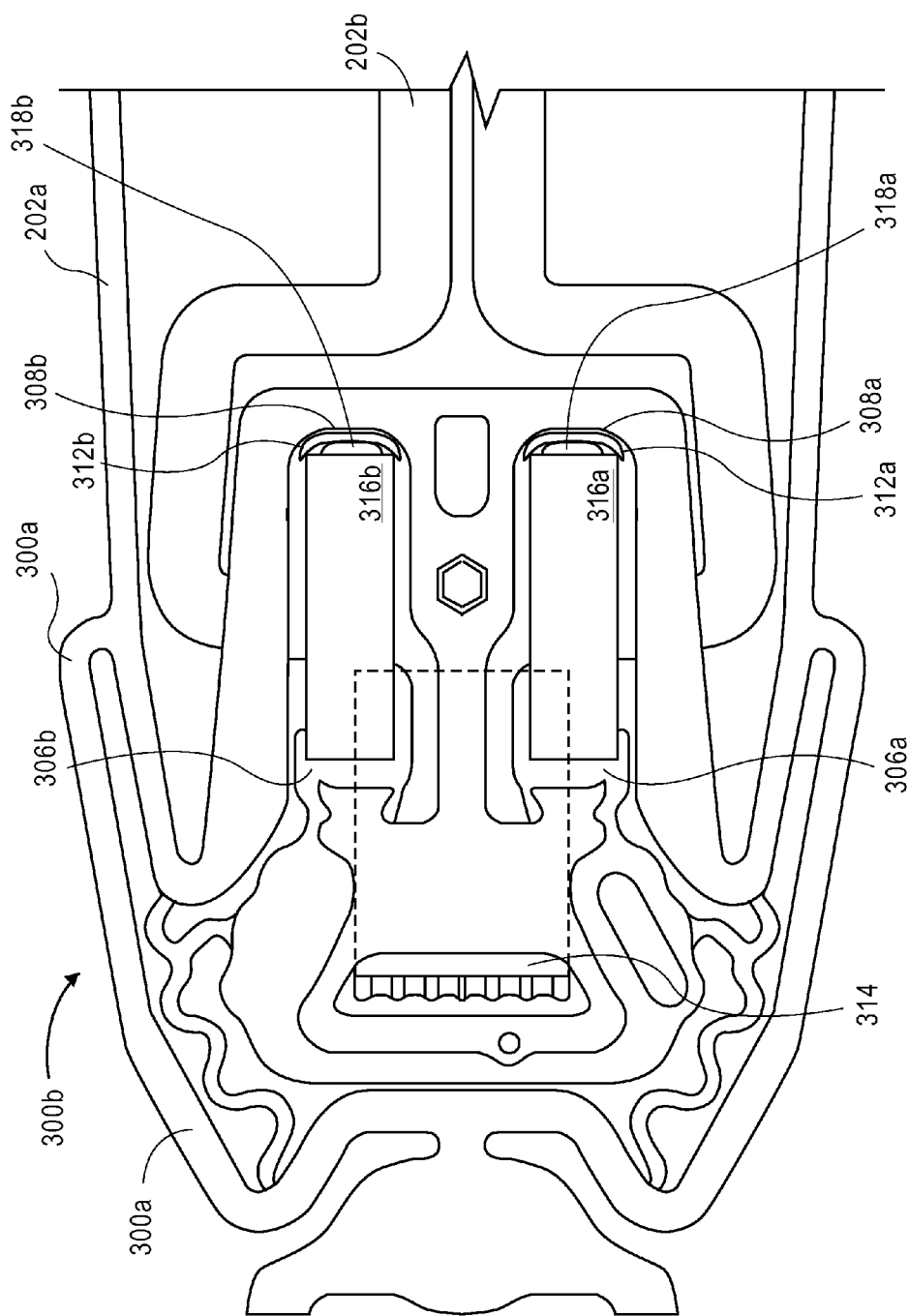
FIG. 3C is a top plan view illustrating the flexure gimbal assembly of FIG. 3A, illustrated with slider and piezo actuating devices in place, according to an embodiment of the invention.

FIG. 3C is a top plan view illustrating the flexure gimbal assembly of FIG. 3A, illustrated with slider 314 and piezo actuating devices 316a, 316b in place, according to an embodiment of the invention. As mentioned, flexure assembly 300b comprises the components of flexure assembly 300a of FIG. 3A, with the slider 314 and piezo actuating devices 316a, 316b attached.

As is illustrated in FIGS. 3B and 3C, each piezo actuating device 316a, 316b is mounted at one end (distal end) to a respective piezo hinge 306a and piezo hinge 306b, and at the other end (proximal end) to a respective leading edge portion 308a and leading edge portion 308b, of flexure tongue 310. The microactuator selectively rotates the slider 314 about the dimple axis 210 (FIG. 2). Opposite polarity voltage is applied to the two different piezo actuating devices 316a and 316b, such that one piezo expands and the other piezo contracts to rotate the slider 314, under a corresponding moment force. Piezo hinge 306a and piezo hinge 306b allow the two different piezos to simultaneously extend and contract in a linear manner, while allowing the slider attachment platform 302 and slider 314 to rotate.

Reducing Electrical Shorts in a Flexure Gimbal Assembly

With further reference to FIGS. 3A-3C, note that the piezo actuating devices 316a, 316b are attached to the leading edge portion 308a and leading edge portion 308b of flexure tongue 310, which is part of the insulator layer 202b. However, in close proximity to the insulator layer 202b, in the areas of leading edge portions 308a, 308b, is the stainless steel layer 202a. With this minute and tight tolerance scenario, assembling such microactuators is prone to a percentage of failures due to electrical shorts between (1) the electrically conductive attachment means, such as electrically conductive adhesive, used to attach the piezo actuating devices 316a, 316b to the flexure tongue 310 and (2) the stainless steel layer 202a of the flexure gimbal assembly 202.

Therefore, according to an embodiment, the flexure tongue 310 is fabricated with a respective gap 312a and gap 312b near each leading edge portion 308a and leading edge portion 308b. Thus, when the electrically conductive attachment means is applied to assemble each piezo actuating device 316a, 316b to its respective leading edge portion 308a, 308b of the flexure tongue 310, each gap 312a, 312b is positioned so as to inhibit contact between the electrically conductive attachment means and the electrically conductive spring layer. According to an embodiment, each gap 312a, 312b is positioned so as to inhibit contact between the electrically conductive adhesive 318a, 318b (FIG. 3C) and the electrically conductive stainless steel layer 202a, whereby each gap 312a, 312b effectively functions as a moat between the adhesive 318a, 318b and the stainless steel layer 202a.

More specifically and according to an embodiment, each gap 312a, 312b is positioned between (1) the area of the flexure tongue 310 at which the conductive adhesive is applied and (2) the stainless steel layer 202a. Such positioning of gap 312a, 312b functions to inhibit the flow of the conductive adhesive 318a, 318b across the thin gap between the flexure tongue 310 and the stainless steel layer 202a and into contact with the stainless steel layer 202a, thereby prohibiting or greatly reducing the possibility of an electrical short between each piezo actuating device 316a, 316b and the stainless steel layer 202a.

FIG. 4 is a flowchart illustrating a process for manufacturing a flexure gimbal assembly for a hard disk drive, according to an embodiment of the invention. At block 402, using an electrically conductive adhesive, attach one or more piezo actuating device to a flexure tongue of a flexure, having an electrically conductive layer and an insulating layer including the flexure tongue, where the flexure tongue comprises a gap positioned to inhibit contact between the conductive adhesive and the conductive layer of the flexure. For example, attach one or more piezo actuating device 316a, 316b (FIG. 3B) to a flexure tongue 310 (FIG. 3B) of a flexure 202 (FIG. 3A) that has an electrically conductive layer 202a (FIG. 3A) and an insulating layer 202b (FIG. 3A) including the flexure tongue 310, where the flexure tongue comprises a gap 312a, 312b (FIGS. 3A-3C) positioned to inhibit contact between the conductive adhesive 318a, 318b (FIG. 3C) and the conductive layer 202a of the flexure 202.

Electrically Conductive Adhesive Viscosity

Study of various electrically conducting adhesives having different dynamic viscosities has shown that if the viscosity of the adhesive is too high, then the piezo actuating device is likely to attach to the flexure tongue in a manner floating above the flexure tongue, which is likely not desirable. Also, study has shown that if the viscosity of the adhesive is too low, then the adhesive is likely to overflow to underneath the flexure tongue, possibly even via a gap such as gap 312a, 312b, which again is likely not desirable.

According to an embodiment, the conductive adhesive 318a, 318b has a dynamic viscosity ranging from 10 Pascal-second (Pa s) to 60 Pascal-second (Pa s), to inhibit the piezo actuating device 316a, 316b from floating or over-floating on the flexure tongue 310, and to inhibit the adhesive 318a, 318b form overflowing to underneath the flexure tongue 310.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A flexure gimbal assembly for a hard disk drive, comprising:
    a flexure comprising:
        an electrically conductive spring layer, and
        an insulating layer comprising a flexure tongue;
    a microactuator comprising at least one piezo actuating device coupled to said insulating flexure tongue with electrically conductive adhesive, said microactuator configured to provide a moment force for rotating a head slider; and
    wherein said flexure tongue comprises a gap in said insulating layer of said flexure tongue and entirely enclosed by said flexure tongue, said gap positioned such that said gap inhibits contact and a corresponding electrical short between said conductive adhesive and said conductive spring layer.

2. The flexure gimbal assembly of claim 1, wherein said gap is positioned between said at least one piezo actuating device and said conductive spring layer thereby inhibiting the flow of said conductive adhesive into contact with said conductive spring layer.

3. The flexure gimbal assembly of claim 1, wherein said conductive adhesive comprises an adhesive having a dynamic viscosity in a range of 10 Pascal-second (Pa-s) to 60 Pascal-second (Pa-s).

4. A hard disk drive, comprising:
    a disk media rotatably mounted on a spindle;
    a suspension coupled to an actuator arm, said suspension comprising a flexure gimbal assembly comprising:
        a flexure comprising:
            an electrically conductive spring layer, and
            an insulating layer comprising a flexure tongue,
        a microactuator comprising at least one piezo actuating device coupled to said insulating flexure tongue with electrically conductive adhesive, said microactuator configured to provide a moment force for rotating a head slider,
        wherein said flexure tongue comprises a gap in said insulating layer of said flexure tongue and entirely enclosed by said flexure tongue, said gap positioned such that said gap inhibits contact and a corresponding electrical short between said conductive adhesive and said conductive spring layer; and
    a voice coil motor configured to move said suspension and said head slider to access portions of said disk media.

5. The hard disk drive of claim 4, wherein said gap of said flexure tongue is positioned between said at least one piezo actuating device and said conductive spring layer thereby inhibiting the flow of said conductive adhesive into contact with said conductive spring layer.

6. The hard disk drive of claim 4, wherein said conductive adhesive comprises an adhesive having a dynamic viscosity in a range of 10 Pascal-second (Pa-s) to 60 Pascal-second (Pa-s).

7. A method for manufacturing a flexure gimbal assembly for a hard disk drive, the method comprising:
    attaching, using an electrically conductive adhesive, at least one piezo actuating device to an insulating flexure tongue of a flexure comprising an electrically conductive spring layer and an insulating layer comprising said flexure tongue, wherein said flexure tongue comprises a gap in said insulating layer of said flexure tongue and entirely enclosed by said flexure tongue, said gap positioned such that said gap inhibits contact and a corresponding electrical short between said conductive adhesive and said conductive spring layer.

8. The method of claim 7, wherein said attaching includes attaching said at least one piezo actuating device to said insulating flexure tongue having said gap in said insulating layer of said flexure tongue positioned between said at least one piezo actuating device and said conductive spring layer thereby inhibiting the flow of said conductive adhesive into contact with said conductive spring layer.

9. The method of claim 7, wherein said attaching includes attaching using said conductive adhesive having a dynamic viscosity in a range of 10 Pascal-second (Pa-s) to 60 Pascal-second (Pa-s) to inhibit said at least one piezo actuating device from over-floating on said adhesive over said flexure tongue and to inhibit said adhesive from overflowing to underneath said flexure tongue.

* * * * *